(12) United States Patent
Stahlfeld et al.

(10) Patent No.: US 12,155,208 B2
(45) Date of Patent: *Nov. 26, 2024

(54) DISCOVERING UPGRADE TO INCREASE CAPACITY FOR SUPPORTING ELECTRICAL LOAD AT PARTICULAR LOCATION OF POWER GRID

(71) Applicant: Coulomb Technologies, Palo Alto, CA (US)

(72) Inventors: Phillip Ellsworth Stahlfeld, Mountain View, CA (US); Lucas Michael Ackerknecht, San Francisco, CA (US)

(73) Assignee: Coulomb Technologies, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,415

(22) Filed: Jan. 26, 2024

(65) Prior Publication Data

US 2024/0339832 A1    Oct. 10, 2024

Related U.S. Application Data

(63) Continuation of application No. 18/457,069, filed on Aug. 28, 2023, now Pat. No. 11,901,732.

(60) Provisional application No. 63/494,616, filed on Apr. 6, 2023.

(51) Int. Cl.
*H02J 3/00* (2006.01)
*B60L 53/62* (2019.01)

(52) U.S. Cl.
CPC .......... *H02J 3/00125* (2020.01); *B60L 53/62* (2019.02); *H02J 3/0012* (2020.01); *H02J 2203/10* (2020.01); *H02J 2203/20* (2020.01); *H02J 2310/70* (2020.01)

(58) Field of Classification Search
CPC .. H02J 3/00125; H02J 3/0012; H02J 2203/10; H02J 2203/20; H02J 2310/70; B60L 53/62

See application file for complete search history.

(56) References Cited

U.S. PATENT DOCUMENTS

| | | | |
|---|---|---|---|
| 11,527,025 B2 * | 12/2022 | Abi-Rached | G06Q 10/06312 |
| 2010/0138065 A1 * | 6/2010 | Taft | H02J 3/144 703/2 |
| 2013/0080205 A1 | 3/2013 | Anderson et al. | |
| 2013/0232094 A1 | 9/2013 | Anderson et al. | |
| 2014/0058575 A1 | 2/2014 | Ashworth et al. | |

(Continued)

*Primary Examiner* — Santosh R Poudel
(74) *Attorney, Agent, or Firm* — PERKINS COIE LLP; Alberto Araiza

(57) ABSTRACT

A system can obtain data that is sourced from an operator of a power grid and includes data items provided on a per-segment basis for feeders. The system can branch the data items into respective feeder groups and generate a data structure based on an adjacency map for segments of a feeder group. The system can construct a feeder load profile based for a feeder on the ordered data structure. The feeder load profile depicts a load capacity for the feeder as a function of a distance from the substation. The system can then determine, based on the feeder load profile, that an available load capacity at the interconnection point is below a threshold required to support an electric vehicle (EV) charging station and identify upgrades based on variations in the feeder load profile to support the EV charging station.

20 Claims, 9 Drawing Sheets

(56) References Cited

U.S. PATENT DOCUMENTS

| | | |
|---|---|---|
| 2016/0156226 A1 | 6/2016 | Itaya |
| 2020/0079346 A1* | 3/2020 | Payne .................. B60W 20/12 |
| 2021/0142537 A1 | 5/2021 | Abi-Rached et al. |
| 2022/0111751 A1 | 4/2022 | Kim et al. |
| 2022/0343230 A1* | 10/2022 | Casey .................... G06F 30/18 |
| 2023/0005126 A1* | 1/2023 | Shaotran ................ G06V 10/82 |
| 2023/0044973 A1* | 2/2023 | Casey .................. G06Q 50/06 |

\* cited by examiner

DISCOVERING UPGRADE TO INCREASE CAPACITY FOR SUPPORTING ELECTRICAL LOAD AT PARTICULAR LOCATION OF POWER GRID

CROSS-REFERENCE TO RELATED APPLICATION(S)

This application is a continuation of U.S. patent application Ser. No. 18/457,069, filed Aug. 28, 2023, which claims the benefit of U.S. Provisional Application No. 63/494,616, filed Apr. 6, 2023, which is incorporated herein by reference in its entirety for all purposes.

BACKGROUND

An electric power system is a network of electrical components deployed to supply, transfer, and use electric power. An example of a power system is the electrical grid ("power grid") that provides power to homes and industries within an extended area. The power grid can be broadly divided into the generators that supply the power, the transmission system that carries the power from the generating centers to the load centers, and the distribution system that feeds the power to nearby homes and industries.

Smaller power systems are also found in industry, hospitals, commercial buildings, and homes. A single line diagram helps to represent this whole system. Most of these systems rely upon three-phase AC power—the standard for large-scale power transmission and distribution across the modern world. Specialized power systems that do not always rely upon three-phase AC power are found in aircraft, electric rail systems, ocean liners, submarines, and automobiles.

BRIEF DESCRIPTION OF THE DRAWINGS

Detailed descriptions of implementations of the present technology will be described and explained through the use of the accompanying drawings.

Figure 1A:
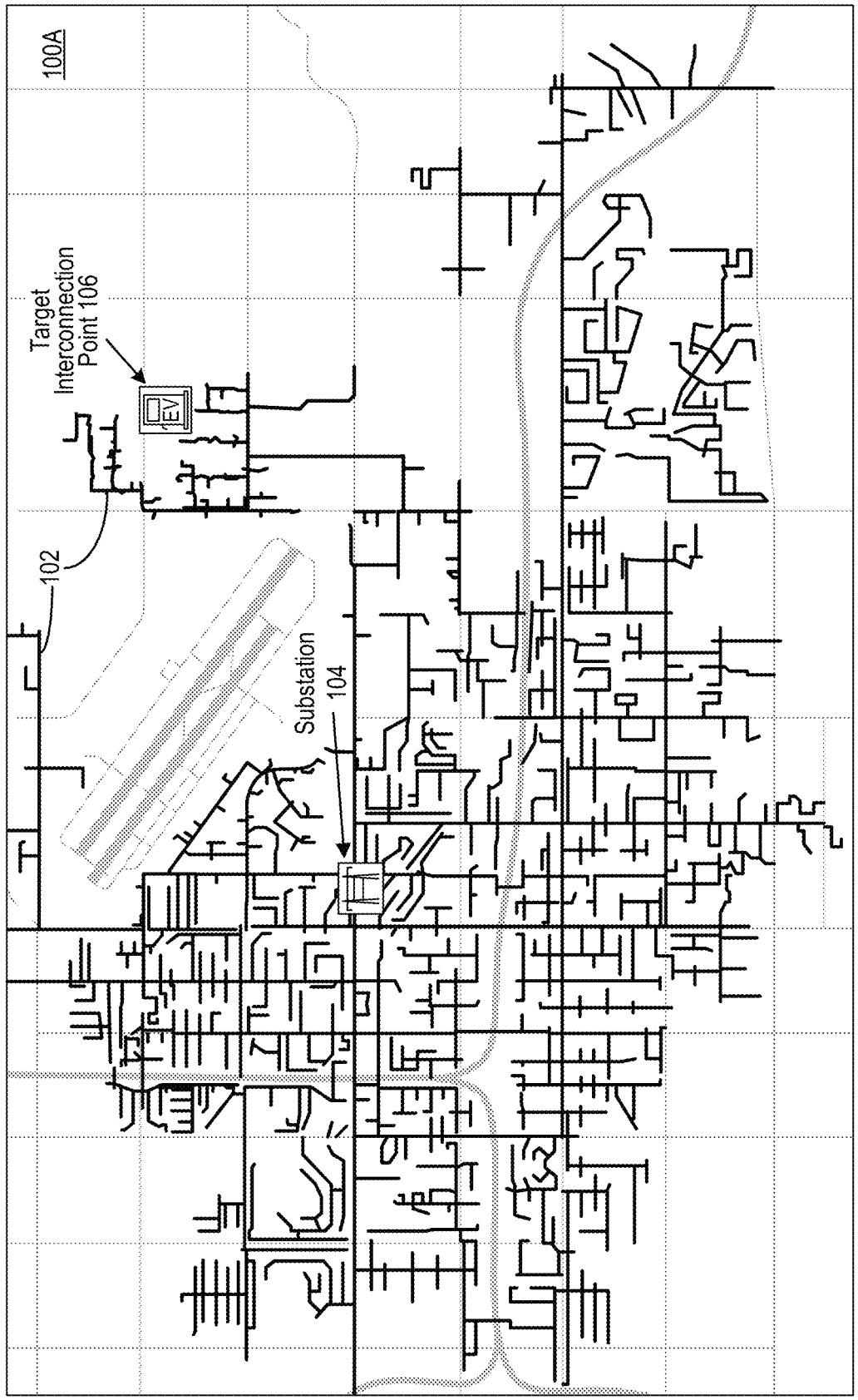
FIG. 1A illustrates a geographical map including an example of an electrical grid including at least one substation and connected feeders.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology relates to efficiently upgrading an electric power grid ("power grid") with sufficient capacity to support an electrical load at an interconnection point of the power grid. An example includes upgrading the power grid to support an electric vehicle (EV) charging station at a desired location. In particular, an EV charger consumes a large electrical load such that, when connecting to the power grid, there must be enough spare load capacity to support the EV charger or the grid must be upgraded to accommodate the additional load. Another example of an electrical load includes a large-scale storage system (e.g., battery), where a developer would benefit from understanding load capacity upgrade costs that are afforded by the disclosed technology. The disclosed technology includes a process for estimating an existing load capacity along a path of the power grid to a target location. The existing load capacity is used to generate a feeder load profile, which is analyzed to identify one or more grid upgrades that can achieve a minimum load capacity for siting an EV charging station at the location and simulates the effect of the one or more upgrades. The disclosed technology can thus determine one or more types of potential grid changes or upgrades to cost-effectively achieve a desired spare load capacity at an interconnection point of a power system. This allows a government agency or private developer to, for example, build accurate models when developing a cost-effective project for EV charging stations. As such, the technology can mitigate climate change because it improves the efficiency of the power grid and promotes adoption in the ratio of EVs to gas vehicles, which reduces or prevents additional greenhouse gas emissions.

The disclosed technology can build a feeder load profile that indicates an existing spare load capacity at an interconnection point for an EV charging station and can determine one or more grid upgrades that can increase the spare load capacity. In particular, the feeder load profile is used to identify and discover the effect of one or more grid upgrades on spare load capacity. The feeder load profile, as used herein, can refer to a numerical representation or visualization (e.g., graph) that illustrates a load capacity of a feeder a distance from the substation at a location where the EV charger will be placed. The numerical representation or visualization indicates one or more sources of reduced load capacity, indicates one or more upgrades to counter the reduced load capacity, and allows for simulating an effect of the one or more upgrades on the feeder load profile to support connecting an EV charger to an interconnection point.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Power Grid Upgrade Discovery to Support EV Charging Station

The technology includes feeder lines (also referred to as "feeders" herein and known as "transmission lines" or "distribution lines") that are viewed as independent circuits within distribution systems that deliver power from a substation to a specific geographic location, such as a neighborhood. A common feeder type is a "radial feeder," which is a feeder system where there is only one path between any two points on a single feeder. FIGS. 1A through 2 use a radial feeder system as an example, though the disclosed technology is not to be construed as limited to radial feeder systems.

FIG. 1A illustrates a geographical map including an example of an electrical grid 100A ("power grid 100A") including connected feeders 102 of a feeder system and at least one substation 104. Typical for a substation, the feeder system shown includes many distinct feeders 102. These feeders 102 deliver power to the area near the substation 104. To interconnect a large load, like an EV charging station, a developer must find and connect to a feeder that provides sufficient power to a location of a target interconnection point 106. If a developer wants to install an EV charging station at the location of the target interconnection point 106, the developer must connect it to the feeder line nearest to the target interconnection point 106.

Figure 1B:
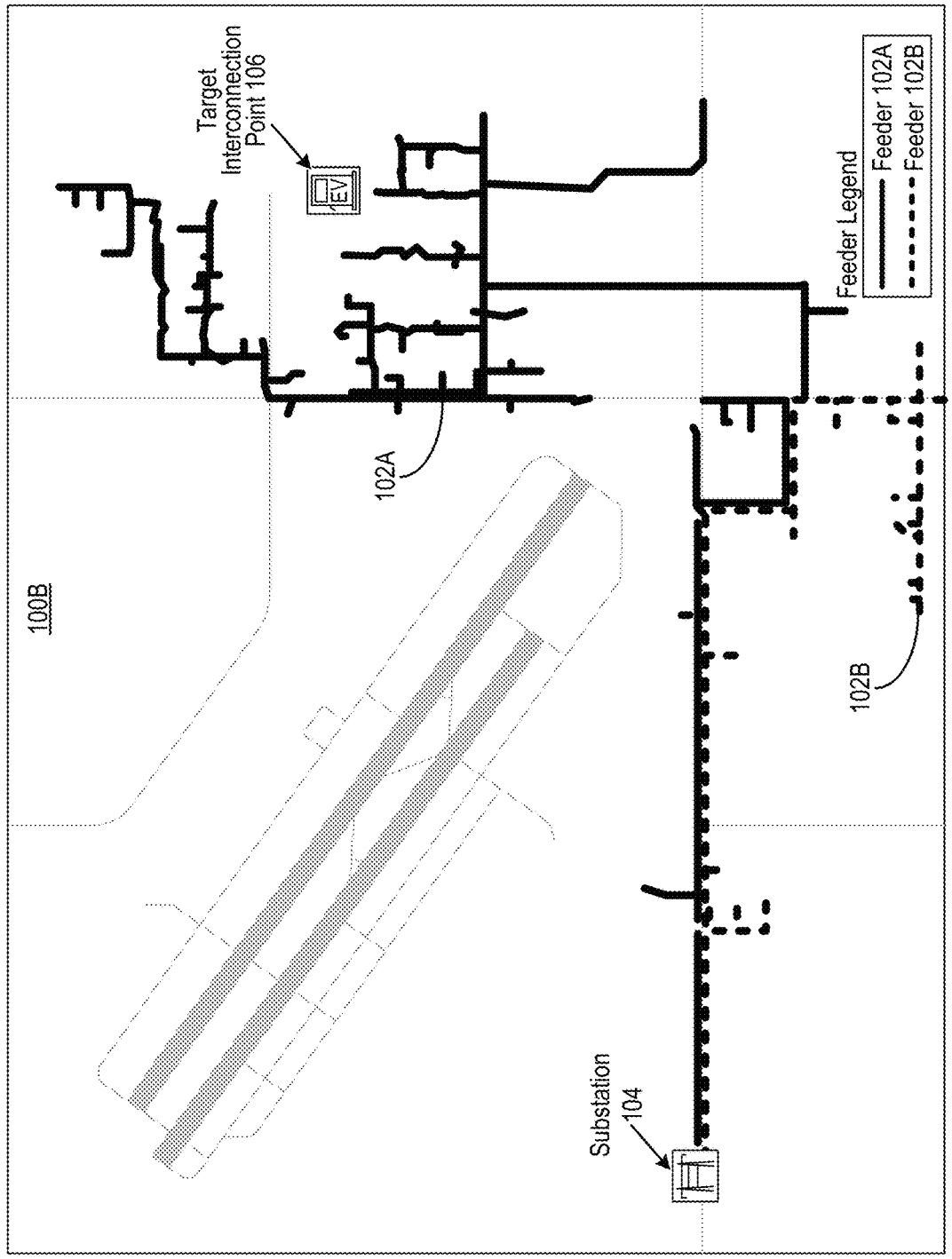
FIG. 1B illustrates an example of multiple feeders connected to a substation.
Figure 2:
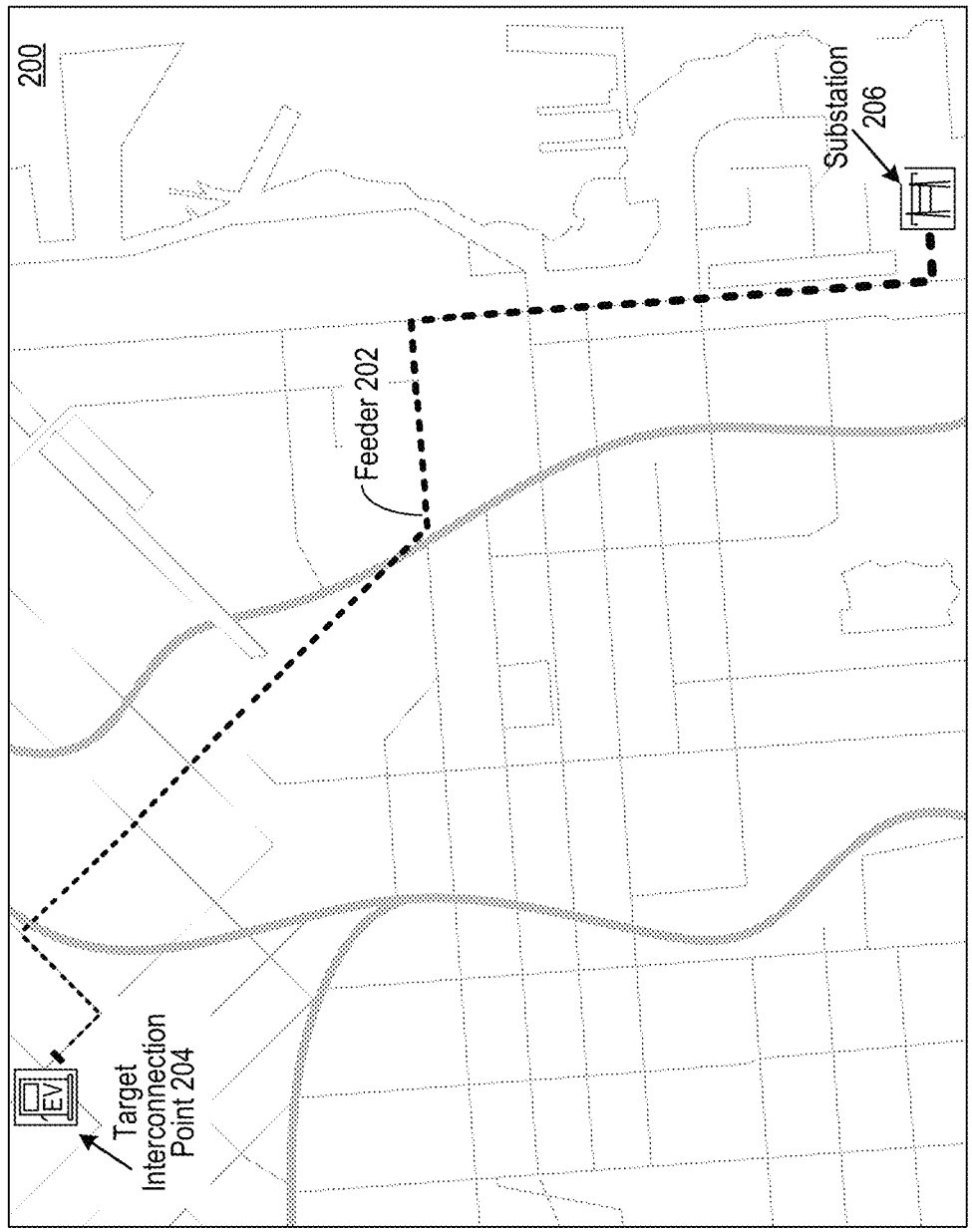
FIG. 2 illustrates an example of a target segment path.

FIG. 1B illustrates portions of two feeders 102A and 102B of a portion 100B of the power grid 100A. In particular, FIG. 1B illustrates two separate feeders 102A and 102B connected to the same substation 104. The solid black line represents the feeder 102A that runs from the substation 104 to all the areas powered by that feeder, including the potential EV charging station at the target interconnection point 106 for the EV charging station. The dotted black line represents a second, distinct feeder 102B that can deliver power to areas that are also powered by the solid black line feeder 102A and other areas that are not powered by the solid black line feeder 102A.

Figure 1C:
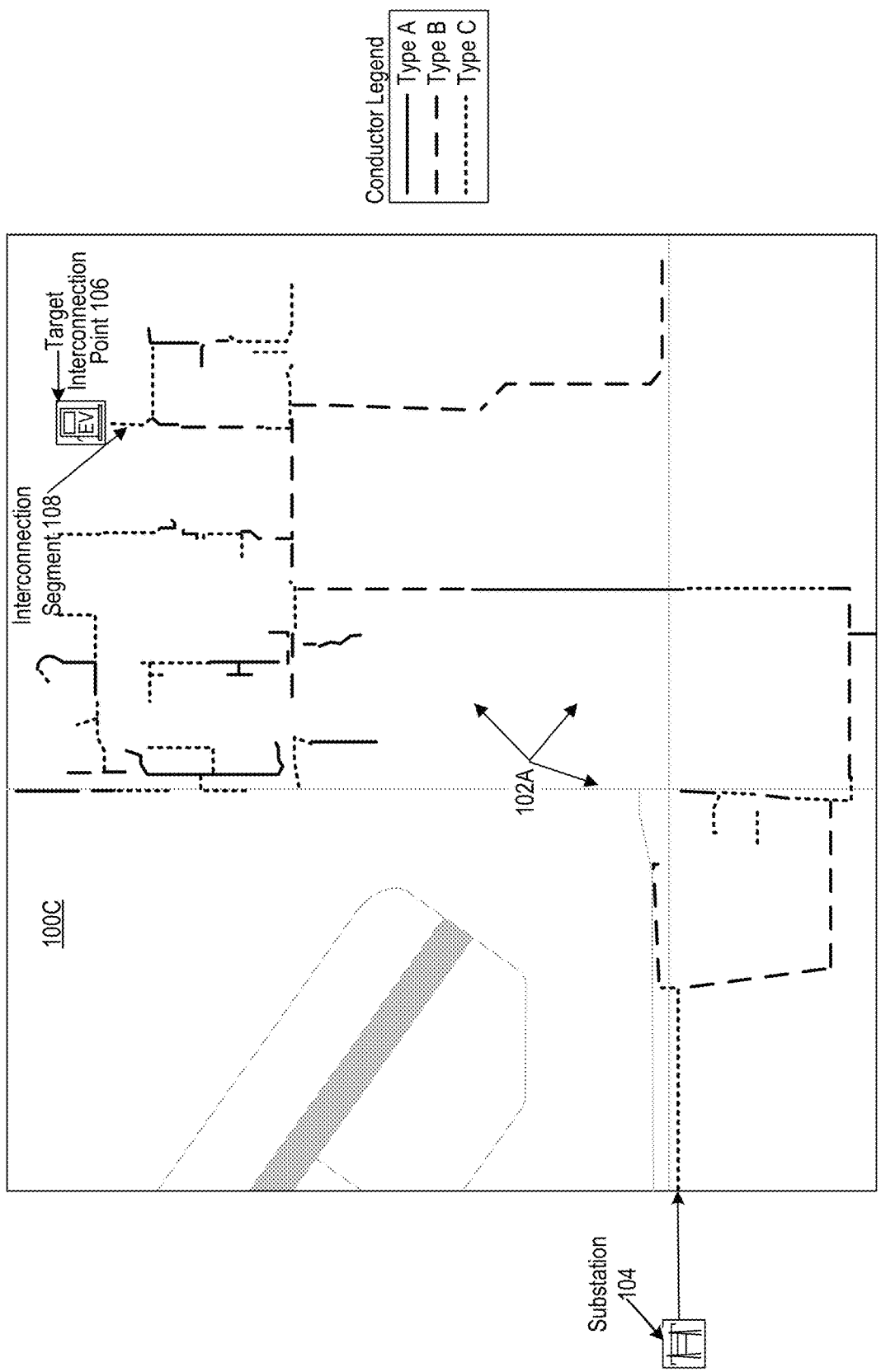
FIG. 1C illustrates a feeder line broken down into component line segments.

FIG. 1C illustrates a portion 100C corresponding to portion 100B and showing the solid black line feeder 102A broken down into component feeder line segments ("feeder segments" or "segments"). Large utility companies publish data about feeders in their electrical system on a per-segment basis. The segments are portions of feeders where the utilities assume continuous electrical properties. As such, segments can vary significantly in length. The present technology uses the data published by utilities to build the feeder profile. As illustrated in FIG. 1C, a single feeder 102A is made up of many segments that are of type A, type B, or type C. Since these segments have varying electrical properties (e.g., spare capacity), a developer would desire to know the path of substation 104 to a target interconnection point 106 for the EV charging station. The segment that includes the target interconnection point 106 is an interconnection segment 108 of the feeder 102A.

FIG. 2 illustrates a map 200 including an example of a feeder 202 that forms an electrical path from a target interconnection point 204 to a substation 206. The path comprises the route that electricity travels from the substation 206 to the developed large load (e.g., EV charger). Beginning at the substation 206, the feeder 202 is illustrated thickest to represent a higher capacity. The feeder 202 is illustrated thinner closer to the target interconnection point 204 because each conductor must support its downstream loads. As such, conductors are represented thinner as distance from the substation 206 increases because less load is supported further from the substation 206. Consequently, a conductor connected directly to the substation 206 handles an entirety of the load on the feeder and a final conductor that connects a particular load to the feeder only needs to support that particular load. Thus, the further from the substation 206, in this example, the less load capacity is available.

Figure 3A:
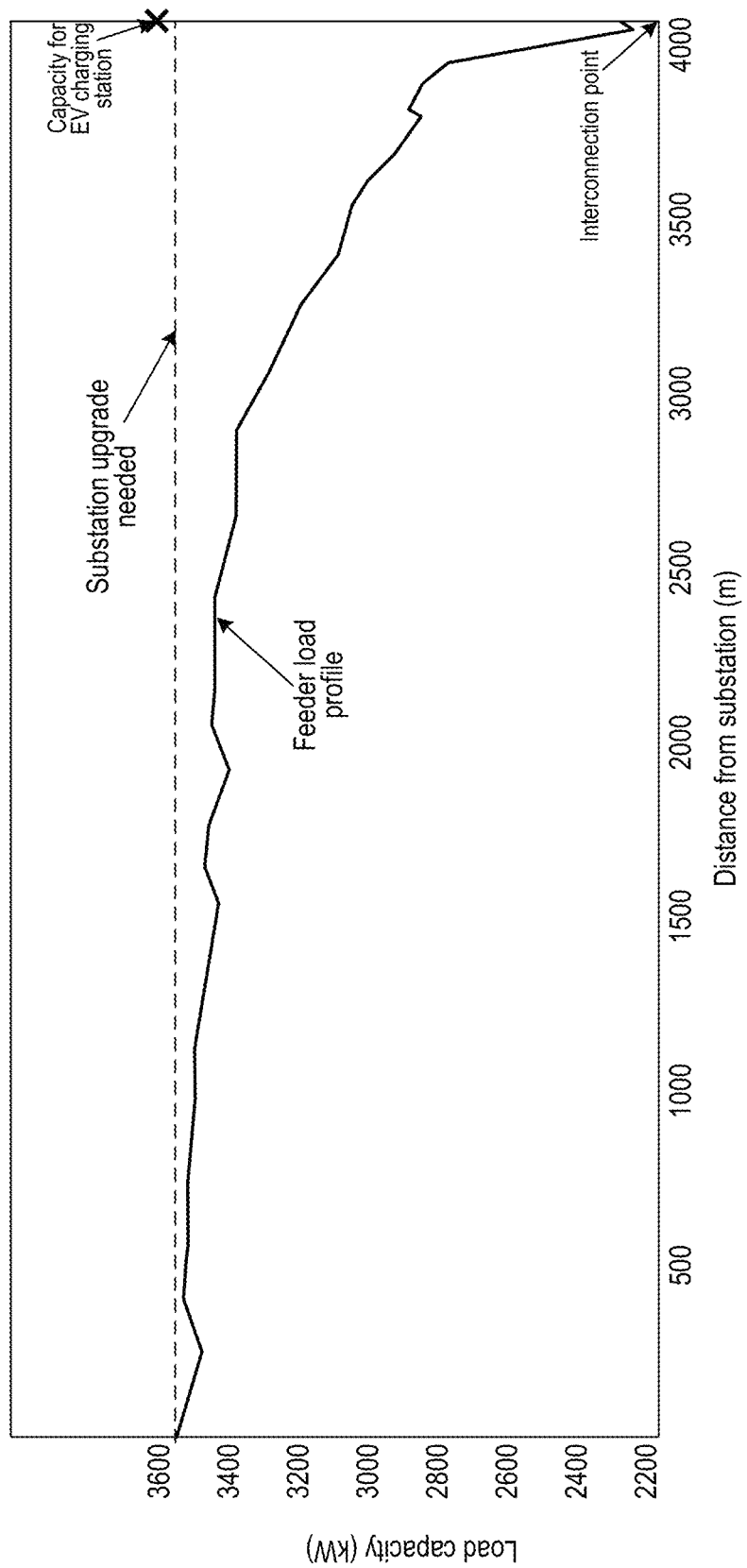
FIGS. 3A, 3B, and 3C illustrate a feeder load profile indicative of different grid upgrades that would allow for placing an electric vehicle (EV) charging station at a particular distance from the substation.
Figure 3B:
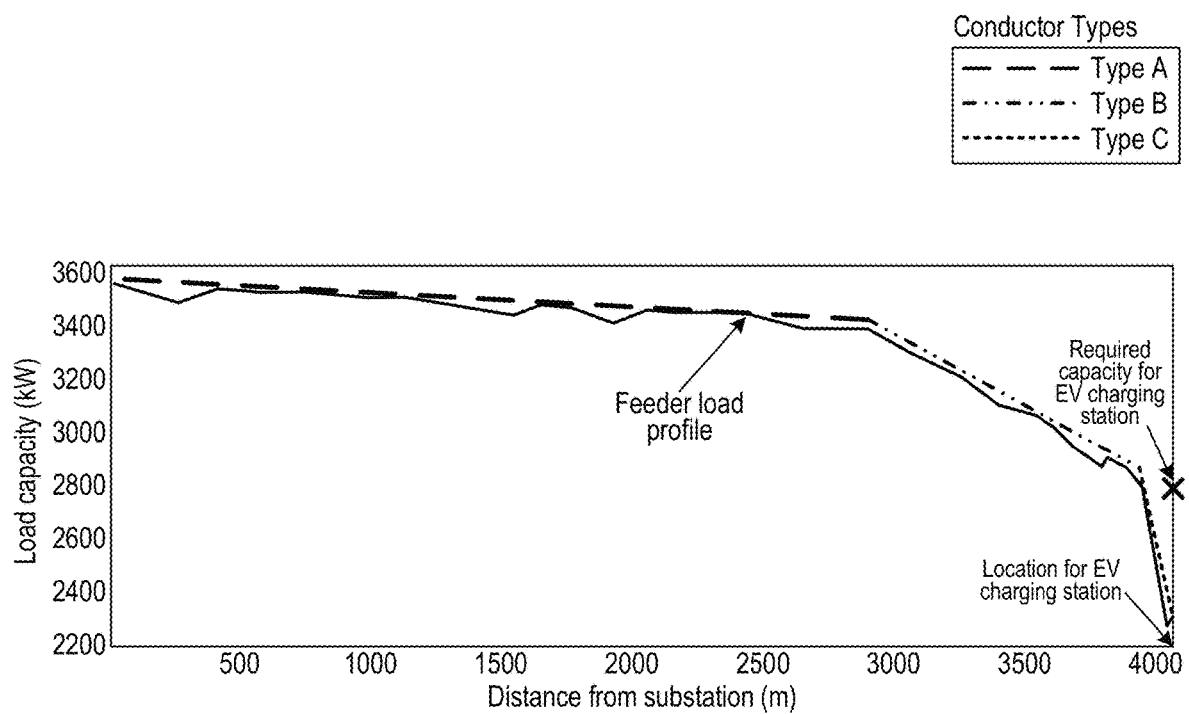
Figure 3C:
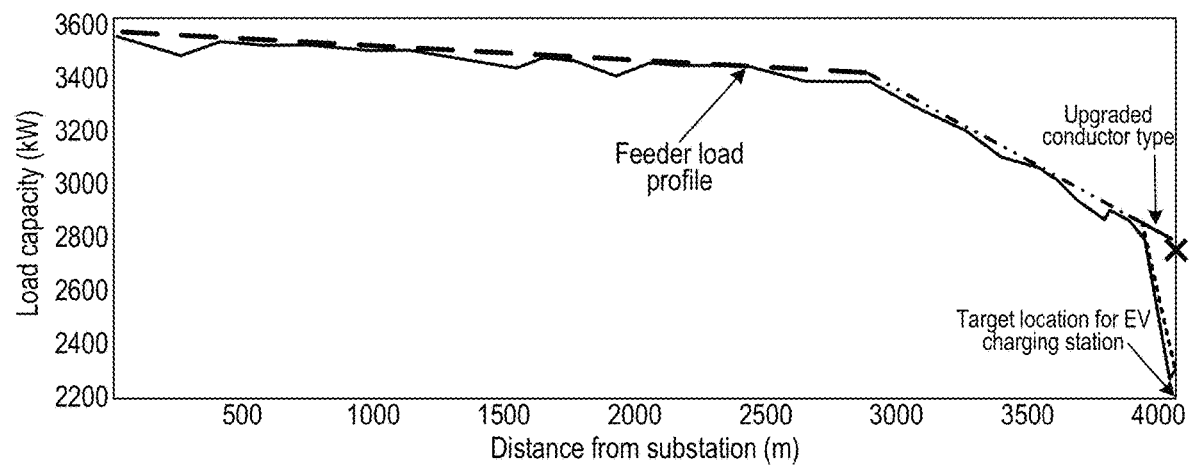

FIGS. 3A, 3B, and 3C illustrate a graphical representation of a feeder load profile from which different grid changes (e.g., upgrades) are inferred to support an EV charging station at a target location a distance from a substation. The present technology builds the feeder load profile using data of feeder line segments published by utility companies. The utility company collects data and computes values about segments of feeder lines of a power grid. In one example, a utility company runs power-flow simulations on the models of the power grid to compute the load capacity for each segment. The data can include data items indicative of a load capacity of a particular segment at a particular location of a region. However, the data for the different segments of a feeder line are not necessarily associated with each other. In other words, the data of one segment of a feeder line is collected and considered independent of another segment of the feeder line. The disclosed technology can generate an ordered data structure for a target feeder line including the target interconnection segment, which includes the target interconnection point for the EV charging station. The ordered data structure includes entries for segments of the same feeder line. The entries include data items for respective segments of the feeder line. The entries are ordered based on the physical distance of a segment from the substation of the feeder line.

The segment closest to the substation can be referred to herein as the "head segment" and the line segment closest to or including the target interconnection point for the EV charging station can be referred to herein as the "interconnection segment." As such, the head segment and the interconnection segment have corresponding entries in the ordered data structure for the feeder line. The remaining segments have entries that are ordered successively based on their corresponding distance from the substation. In one example, the entry for each segment is ordered in a list from the segment nearest to substation to the segment at the feeder's interconnection segment. The distance for each segment can be determined by comparing the location of the substation to a location of a particular segment. The distance can also be determined by comparing the location of a segment to another segment, a selected anchor segment, an adjacent segment, any or every other segment of the feeder line, or combinations thereof.

The disclosed technology can estimate or predict data values for segments that have missing data values. That is, if the comparison returns a discontinuous electrical path from the head segment to the interconnection point segment, the technology can fill in gaps by analyzing disconnected sets of segments from the head segment to the interconnection point segment, for example, a disconnected set in the order of segments such that the geographical distance between each segment is minimized.

With no disconnection points or a completed set of segments after correcting for discontinuities, the system has a list comprising an entirety of the pathway for that power flow from the substation to the interconnection point. With a completed feeder load profile for the desired interconnection point, the system can determine a shortfall of capacity at the interconnection point to support the load capacity of the EV charging station and analyze the feeder load profile to predict upgrades, if any, that are necessary to address the shortfall.

FIG. 3A illustrates an example of a feeder load profile for a feeder line that traverses from the substation to an interconnection point for an EV charging station. As shown, the required load capacity for the EV charging station at the interconnection point is greater than the available load capacity. The system can determine that upgrading a substation would provide the desired load capacity for the EV charging station. In this example, the load capacity for the EV charging station is greater than the load capacity at the interconnection point, and greater than the load capacity of the substation. Thus, upgrading the substation to handle a greater load capacity could support the EV charging station at about 4,100 meters from the substation. Notably, a different upgrade or a combination of additional or other upgrades can achieve the required capacity to support the EV charging station. The system can iteratively generate new feeder load profiles after one or more upgrades or predict feeder load profiles after one or more upgrades. Hence, the system can extrapolate data to determine one or more upgrades that are required to support the EV charging station at the interconnection point.

FIG. 3B illustrates the example feeder load profile of FIG. 3A comprised of three different conductor types A, B, and C. The system can detect the composition of the feeder line based on changes in the slope of the feeder load profile. The changes occur at critical points and result in adjacent, inconsistent slopes. A critical point can include a change in the slope equal to or greater than a threshold amount and indicate the beginning or end of a conductor type (e.g., changed conductor type). A conductor type can be defined based on properties and performance values. Examples of properties include inductance, resistance, capacitance, and conductance. Examples of performance values include efficiency, voltage and current limits, voltage regulation, and propagation delay. Changes in the properties or performance values can define different conductor types. In one example, a slope that declines by 20 degrees or more can indicate a different conductor type. As shown, there are at least two critical points on the feeder load profile. The first critical point is at about 2,900 meters and the second critical point is at about 3,900 meters. Thus, the feeder line has at least three successive segments that delineate a conductor type A, conductor type B, and conductor type C. The slope of each segment is substantially consistent for a conductor type but different for different conductor types.

As shown, the required load capacity for the EV charging station at the interconnection point is greater than the available load capacity. The system can determine an upgrade including changing the conductor type in the last segment of the feeder line to provide the desired load capacity for the EV charging station. As shown, the load capacity for the EV charging station is greater than the 2,250 kW load capacity at the interconnection point. Thus, upgrading the conductor type at the interconnection point to handle a greater load capacity could support the EV charging station.

FIG. 3C illustrates the example feeder load profile of FIG. 3B where a conductor upgrade of the interconnection segment accommodates the required load capacity to support the EV charging station. As shown, the interconnection segment was upgraded from conductor type C to another conductor type that extends the slope of the segment for conductor type C to the interconnection point. The interconnection segment could be the same or different from the conductor type B of the adjacent segment. In the example, the required load capacity is greater than the available load capacity at the interconnection point, but less than the projected capacity if the conductor type of the interconnection segment is upgraded.

Figure 3D:
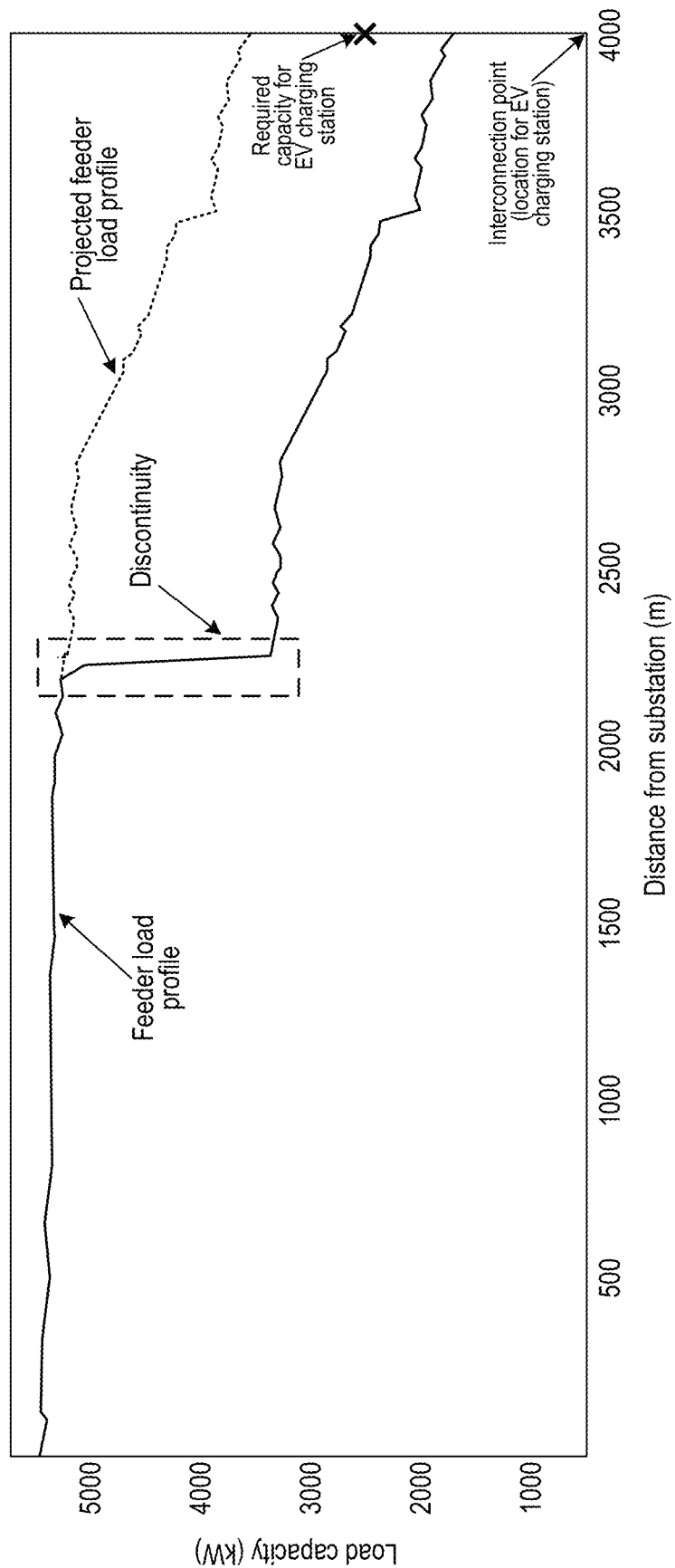
FIG. 3D illustrates the feeder load profile graph of FIGS. 3A-3C showing an event that indicates a component upgrade would allow placing an EV charging station at a particular distance from the substation.

FIG. 3D illustrates another example of a feeder load profile that can be used to identify an upgrade for supporting the load capacity of an EV charging station at the interconnection point. As shown, the feeder load profile has a discontinuity at a critical point where the load capacity drops from about 5,000 kW to about 3,200 kW at 2,250 meters from the substation. As a result of the discontinuity, the available load capacity at the interconnection point is below the required capacity for supporting the EV charging station.

The change in the load capacity exceeds a threshold amount that creates the discontinuity, which is indicative of a need for an upgrade to an electrical component (e.g., fuse, circuit breaker, transformer) to provide a prospective load capacity that is equal to or greater than the required load capacity for the EV charging station. In this example, the system detects a sharp decrease in load capacity. If the desired load capacity at the interconnection point would have been sufficient without the sharp decrease in capacity, the technology can indicate the need for a component upgrade. As shown, the projected feeder load profile has a projected load capacity greater than the required capacity for the EV charging station.

Once all potential upgrades have been determined, the system can translate the upgrades into costs using publicly available data and general guidelines from commercial (e.g., labs) and academic institutions. In one embodiment, machine learning models can be trained to accurately predict upgrade costs. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes clustering, reinforcement learning, probability distributions, decision tree forests, and others. Models can be configured for various situations, data types, sources, and output formats.

In some implementations, the pricing or feeder segment model can include a neural network with multiple input nodes that receive data about feeders. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as project pricing or segment information. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes upgrades as input and a cost as desired output, such as the cost of replacing a substation. A representation of an upgrade cost can be provided to the model. Output from the model can be compared to the desired output for that upgrade cost and, based on the comparison, the model can be modified, such as by changing weights between nodes of the neural network or parameters of the functions used at each node in the neural network (e.g., applying a loss function). After applying each of the values for upgrades in the training data and modifying the model in this manner, the model can be trained to evaluate new upgrades for different power grids. Similarly, a model can be trained based on performance data of power grids to output a proposed upgrade based on variations of a feeder load profile.

The disclosed technology also uses data published by utilities to interact with the user. When developers are examining a site for an EV charging station, they can use the disclosed technology to select the appropriate segment for the site from a map provided by the technology. Once a feeder segment is selected, the technology knows which interconnection point and which feeder is relevant. Then, the relevant feeder load profile is built by accumulating distance information on the X-axis and extracting load capacity values at each distance and placing them on the Y-axis. The disclosed technology can then use the new feeder load profile, as described above, to determine optional upgrades.

Figure 4:
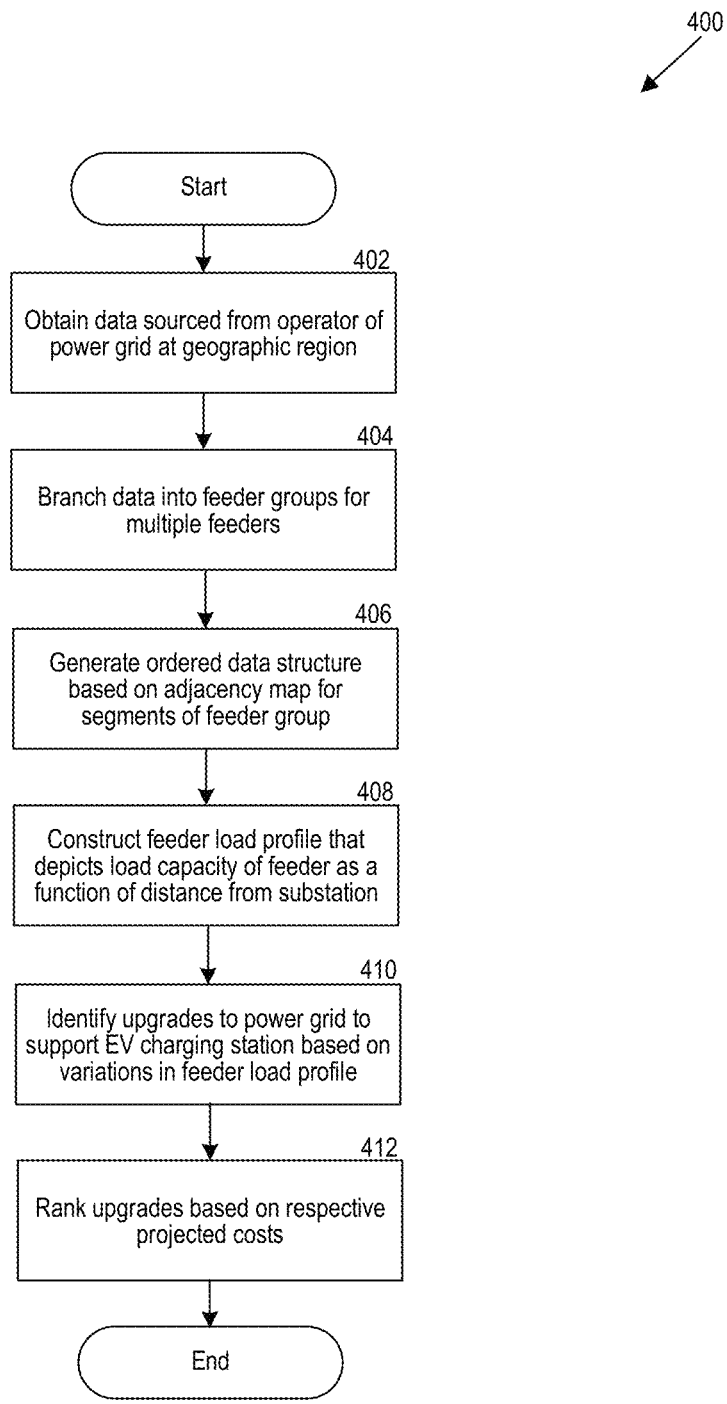
FIG. 4 is a flowchart that illustrates a process to generate a feeder load profile that can be used identify an upgrade to a power grid to support an EV charging station.

FIG. 4 is a flowchart that illustrates a process 400 to generate a feeder load profile, which is used to identify an upgrade to a power grid to support large electrical loads. Examples of the large electrical loads include an EV charging station and large-scale storage systems (e.g., battery storage system), where a developer would benefit from understanding load capacity upgrade costs. The process 400 is performed by a system that includes at least one hardware processor and at least one non-transitory memory storing instructions, which, when executed by the hardware processor, cause the system to perform the process 400.

At 402, the system can obtain a data set that is sourced from an operator of a power grid spanning a geographic region. The data set is captured by multiple feeders connected to a substation of the electric power system. The multiple feeders are each formed from multiple ordered segments, where the data set includes data items provided on a per-segment basis for each feeder.

At 404, the system can branch the data items into respective feeder groups for the multiple feeders, where each feeder group includes data items for segments of a corresponding feeder. The data items for the corresponding feeder are identified based on common electrical properties. The system can aggregate the data of a power grid into feeder groups for respective feeders, where the data is indicative of segments of the feeders and load capacities at their geographic locations.

At 406, the system can generate an ordered data structure based on an adjacency map for segments of a feeder group for a particular feeder. The system can identify data items of segments within a threshold geographical distance of each other, identify a head segment closest to a substation of the power grid, and identify an interconnection segment to include an interconnection point for the EV charging station.

For example, the system can traverse through an adjacency map starting at the head segment by moving data of an identified segment from an unknown set to a known set of segments. The system can identify a subset of segments in the unknown set having a minimum geographic distance to a subset of segments in the known set. The system can update the ordered data structure to indicate adjacent segments having the minimum geographic distance. The process of traversing through the ordered data structure is performed iteratively and terminates when the unknown set is empty.

In one example, the system places data items of the segments of the feeder group into a disconnected set and traverses through the adjacency map, starting at the head segment, by moving data items for an identified segment from the disconnected set to a connected set. The system can identify a subset of segments in the disconnected set having a minimum geographic distance to a subset of segments in the connected set. The system can update the ordered data structure to indicate that the subset of segments in the disconnected set are adjacent to the subset of segments in the connected set. The system traverses through the adjacency map iteratively and terminates when the disconnected set is empty.

In one example, the system can add entries to the ordered data structure that map the segments of the feeder group to a path for power flow from the substation to the interconnection segment. For example, a first entry can correspond to the head segment, a final entry can correspond to the interconnection segment, and successive entries from the first entry to the final entry can correspond to segments that are increasingly distant from the substation.

At 408, the system can construct a feeder load profile based on the ordered data structure. The feeder load profile depicts load capacity for the feeder as a function of a distance from the substation. In one example, the system can generate a graph of the feeder load profile based on the ordered data structure. For example, the horizontal axis of the graph can present distance values of the segments (e.g., length of conductors) from the substation, and the vertical axis of the graph can correspond to load capacity values as a function of the distance values of the segments. A "distance value" refers to the length of a conductor at a given point relative to the substation or another reference point, rather than the physical distance from a location at the given point to the substation. The system can determine, based on the feeder load profile, that an available load capacity at the interconnection point is below a threshold required to support the EV charging station. For example, the system can generate a graphical representation of the feeder load profile including load capacity values as a function of distance values of the segments relative to the substation.

At 410, the system can discover/identify one or more changes to the power grid that would increase the available load capacity at the interconnection point to provide the threshold load capacity required to support the EV charging station. The changes can include upgrades that are identified based on one or more variations in the feeder load profile. For example, the system can correlate the one or more variations to one or more known causes and identify the one or more upgrades based on the one or more causes. The one or more upgrades can include at least one of replacing or modifying the substation, replacing a conductor type of the interconnection segment, or replacing or modifying an electrical component of the power grid. In one example, the system can simulate a change to the substation, a change to the conductor type, or a change to the electrical component. The system can also simulate a projected feeder load profile based on the simulated change to the substation, the conductor type, or the electrical component that would improve the efficiency of the power grid to reduce or prevent greenhouse gas emissions.

In one example, the system detects that a greatest load capacity value of the feeder load profile is below the threshold load capacity required to support the EV charging station and determines that upgrading the substation is required to support the EV charging station at the interconnection segment.

In another example, the system detects at least one critical point in the feeder load profile where a rate of change of the load capacity values exceeds a threshold amount. The rate of change indicates different conductor types before and after the critical point. The system projects that upgrading a conductor type of the interconnection segment would increase the available load capacity at the interconnection point to exceed the threshold load capacity required to support the EV charging station.

In another example, the system detects a discontinuity in the feeder load profile, causing the available load capacity of the feeder to drop below the threshold load capacity required to support the EV charging station. The system projects that upgrading an electrical component (e.g., a fuse, a circuit breaker, a transformer) supporting the feeder would increase the available load capacity at the interconnection point to exceed the threshold load capacity required to support the load capacity of the EV charging station.

At 412, the system can rank the one or more upgrades based on respective projected costs. In one example, a projected cost is based on at least one of publicly available data or guidelines for components of the power grid. The guidelines are issued by a commercial or academic institution or are the output of a machine learning model that is trained based on performance data of power grids. The system can prioritize or select a least cost-prohibitive combination of the one or more upgrades to increase the available load capacity at the interconnection point at or above the threshold load capacity required to support the EV charging station.

Computer System

Figure 5:
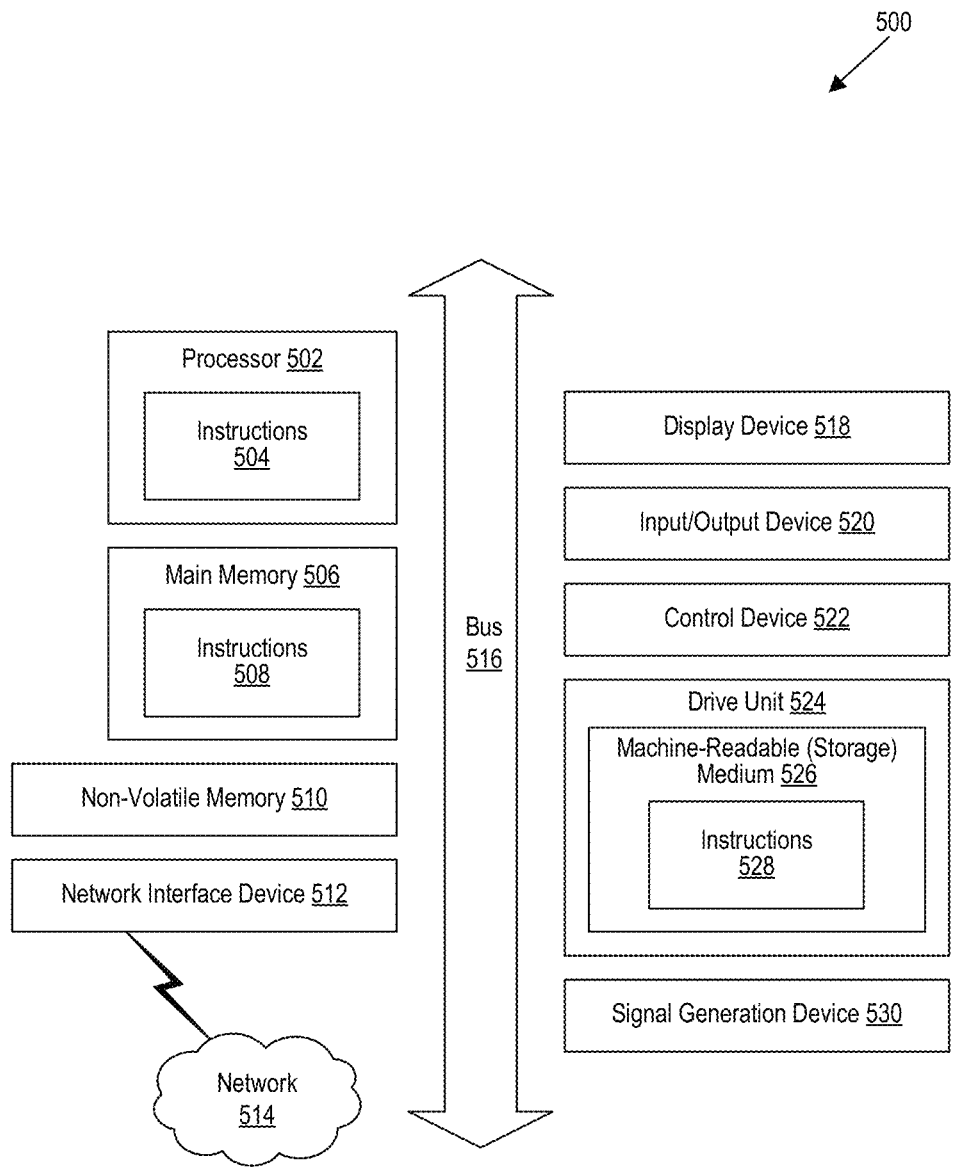
FIG. 5 is a block diagram that illustrates a computer system in which at least some operations described herein can be implemented.

FIG. 5 is a block diagram that illustrates an example of a computer system 500 in which at least some operations described herein can be implemented. As shown, the computer system 500 can include one or more processors 502, main memory 506, non-volatile memory 510, a network interface device 512, a display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 500. In some implementations, the computer system 500 can be an embedded computer system, a system-on-chip (SOC), a single-board computer (SBC) system, or a distributed system such as a mesh of computer systems or include one or more cloud components in one or more networks. Where appropriate, one or more computer systems 500 can perform operations in real time, near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, "non-transitory" refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative combinations or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system comprising:
   at least one hardware processor; and
   at least one non-transitory memory storing instructions, which, when executed by the at least one hardware processor, cause the system to:
   obtain a data set that is sourced from an operator of a power grid,
   wherein the data set is indicative of multiple feeders connected to a substation of the power grid;
   branch the data items into respective feeder groups for the multiple feeders;
   generate a data structure based on an adjacency map for segments of a feeder group for a particular feeder by causing the system to:
   identify a head segment and an interconnection segment including an interconnection point for an electric vehicle (EV) charging station,
   wherein to generate the data structure for segments comprises causing the system to:
   place data items of the segments of the feeder group into a disconnected set;
   traverse through the adjacency map by moving data items for an identified segment from the disconnected set to a connected set;
   identify a subset of segments in the disconnected set having a threshold geographic distance to a subset of segments in the connected set; and
   update the data structure to indicate that the subset of segments in the disconnected set are adjacent to the subset of segments in the connected set.

2. The system of claim 1 further caused to:
   based on the data structure, construct a feeder load profile that depicts load capacity for the particular feeder; and
   determine, based on the feeder load profile, that an available load capacity at the interconnection point is below a threshold load capacity required to support the EV charging station.

3. The system of claim 2 further caused to:
identify, based on one or more variations in the feeder load profile, one or more upgrades to the power grid that would increase the available load capacity at the interconnection point to provide the threshold load capacity required to support the EV charging station.

4. The system of claim 3, wherein to identify the one or more upgrades to the power grid comprises causing the system to: correlate the one or more variations to one or more known causes; and
identify the one or more upgrades based on the one or more known causes,
wherein the one or more upgrades includes at least one of:
replacing or modifying the substation,
replacing a conductor type of the interconnection segment, or
replacing or modifying an electrical component of the power grid.

5. The system of claim 3, wherein to identify, based on the feeder load profile, the one or more upgrades comprises causing the system to:
simulate a change to the substation, a change to a conductor type, or a change to an electrical component; and
simulate a projected feeder load profile based on the simulated change to the substation, the conductor type, or the electrical component that would improve efficiency of the power grid to reduce or prevent greenhouse gas emissions.

6. The system of claim 3, wherein to identify, the one or more upgrades comprises causing the system to:
detect at least one critical point in the feeder load profile where a rate of change of load capacity values exceeds a threshold amount,
wherein the rate of change indicates different conductor types before and after the critical point; and
project that upgrading a conductor type of the interconnection segment would increase the available load capacity at the interconnection point to exceed the threshold load capacity required to support the EV charging station.

7. The system of claim 2 further caused to:
rank two or more upgrades based on respective projected costs,
wherein a projected cost is based on at least one of:
publicly available data or guidelines for components of the power grid,
wherein the guidelines are issued by a commercial or academic institution, or
output of a machine learning model that is trained based on performance data of power grids; and
prioritize at least one cost-prohibitive combination of the two or more upgrades to increase the available load capacity at the interconnection point at or above the threshold load capacity required to support the EV charging station.

8. The system of claim 2 further caused to:
generate a graph of the feeder load profile based on the data structure,
wherein a horizontal axis of the graph presents distance values of the segments from the substation, and
wherein a vertical axis of the graph corresponds to load capacity values as a function of the distance values of the segments.

9. The system of claim 1, wherein to generate the data structure further comprises causing the system to:
add entries to the data structure that map the segments of the feeder group to a path for power flow from the substation to the interconnection segment,
wherein a first entry corresponds to the head segment,
wherein a final entry of corresponds to the interconnection segment, and
wherein successive entries from the first entry to the final entry correspond to segments that are increasingly distant from the substation.

10. A non-transitory, computer-readable storage medium storing instructions recorded thereon that, when executed by at least one data processor of a system, cause the system to:
aggregate data of a power grid into feeder groups for respective feeders,
wherein the data is indicative of segments of the feeders and load capacities at geographic locations; and
generate a data structure including entries for segments of a particular feeder of a feeder group,
wherein a beginning entry is for a head segment closest to a substation of the power grid,
wherein an ending entry is for an interconnection segment including an interconnection point for an electrical load of a battery storage system, and
wherein to generate the data structure comprises causing the system to:
traverse through an adjacency map starting at the head segment by moving data of an identified segment from an unknown set to a known set;
identify a subset of segments in the unknown set having a threshold geographic distance to a subset of segments in the known set; and
update the data structure to indicate adjacent segments having the threshold geographic distance,
wherein traversing through the data structure is performed iteratively and terminates when the unknown set is empty.

11. The non-transitory, computer-readable storage medium of claim 10 further caused to:
generate a feeder load profile based on the data structure,
wherein the feeder load profile depicts load capacity for the particular feeder as a function of a distance from the substation; and
identify, based on the feeder load profile, a change associated with the particular feeder causing an increase in available load capacity at an interconnection point to support the battery storage system.

12. The non-transitory, computer-readable storage medium of claim 11, wherein to identify the change comprises causing the system to:
rank multiple changes based on respective projected costs; and
select the change that is least cost-prohibitive from among the multiple changes.

13. The non-transitory, computer-readable storage medium of claim 11, wherein the system is further caused to:
generate a graphical representation of the feeder load profile including load capacity values as a function of distance values of the segments relative to the substation.

14. The system of claim 10, wherein to generate the data structure further comprises causing the system to:
add entries to the data structure that map the segments of the feeder group to a path for power flow from the substation to the interconnection segment,
wherein a first entry corresponds to the head segment, wherein a final entry of corresponds to the interconnection segment, and wherein successive entries from the first entry to the final entry correspond to segments that are increasingly distant from the substation.

15. The non-transitory, computer-readable storage medium of claim 10, wherein to generate the data structure further comprises causing the system to:

add entries to the data structure to map the segments of the feeder group to a path for power flow from the substation to the interconnection segment, wherein successive entries for the head segment to the interconnection segment correspond to segments that are increasingly distant from the substation.

16. A method comprising:

branching data items of feeders of a power grid connected to a substation into respective groups, wherein each feeder comprises multiple segments, and wherein the data items are provided on a per-segment basis for each feeder;

generating a data structure including entries for data items of segments of a particular group for a particular feeder, wherein an entry corresponds to an interconnection segment including an interconnection point for an electric vehicle (EV) charging station, wherein to generate the data structure comprises:

traversing through an adjacency map by moving data of an identified segment from an unknown set to a known set;

identifying a subset of segments in the unknown set having a threshold geographic distance to a subset of segments in the known set; and updating the data structure to indicate adjacent segments having the threshold geographic distance, wherein traversing through the data structure is performed iteratively and terminates when the unknown set is empty.

17. The method of claim 16 further comprising:

constructing a feeder load profile, based on the data structure, that depicts load capacity for the particular feeder as a function of a distance from the substation; and discovering, based on the feeder load profile, that an upgrade to the power grid is required to increase available load capacity at the interconnection point above a threshold load capacity required to support the EV charging station.

18. The method of claim 17 further comprising:

determining that upgrading the substation would increase the available load capacity at the interconnection point to support the EV charging station at the interconnection segment.

19. The method of claim 17 further comprising:

determining that upgrading a conductor type of the interconnection segment would increase the available load capacity at the interconnection point to support the EV charging station.

20. The method of claim 17 further comprising:

determining that upgrading an electrical component would increase the available load capacity at the interconnection point to support the EV charging station.

* * * * *